(12) United States Patent
Reilly

(10) Patent No.: US 7,305,569 B2
(45) Date of Patent: Dec. 4, 2007

(54) APPARATUS, SYSTEM AND METHOD FOR ADJUSTING A SET OF ACTUAL POWER STATES ACCORDING TO A FUNCTION DEPENDING ON A SET OF DESIRED POWER STATES

(75) Inventor: Patrick L. Reilly, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 417 days.

(21) Appl. No.: 10/880,976

(22) Filed: Jun. 29, 2004

(65) Prior Publication Data

US 2005/0289366 A1 Dec. 29, 2005

(51) Int. Cl.
G06F 1/00 (2006.01)
G06F 1/32 (2006.01)
H04B 1/38 (2006.01)

(52) U.S. Cl. ........................ 713/300; 713/320; 455/574

(58) Field of Classification Search ................ 713/300, 713/310, 320; 455/522, 572, 127.1, 574
See application file for complete search history.

(56) References Cited

U.S. PATENT DOCUMENTS

| 6,178,291 | B1* | 1/2001 | Zenios et al. ................ 392/479 |
| 6,453,472 | B1* | 9/2002 | Leano et al. ................. 725/111 |
| 6,484,041 | B1* | 11/2002 | Aho et al. ................... 455/574 |
| 6,625,478 | B1* | 9/2003 | Nonogaki .................... 455/574 |
| 6,711,388 | B1* | 3/2004 | Neitiniemi ............... 455/127.1 |
| 6,819,008 | B2* | 11/2004 | Kaplan et al. ................. 290/44 |
| 7,062,303 | B2 | 6/2006 | Guterman |
| 7,162,279 | B2* | 1/2007 | Gupta ......................... 455/574 |
| 2004/0204050 | A1* | 10/2004 | Krishnan et al. ......... 455/556.1 |

* cited by examiner

*Primary Examiner*—Suresh K Suryawanshi
(74) *Attorney, Agent, or Firm*—Schwegman, Lundberg & Woessner, P.A.

(57) ABSTRACT

Apparatus and systems, as well as methods and articles, may operate to compare a set of desired power states associated with components included in an applications subsystem and one or more operations with a set of actual power states. The set of actual power states may be adjusted according to a function that depends on the set of desired power states.

21 Claims, 3 Drawing Sheets

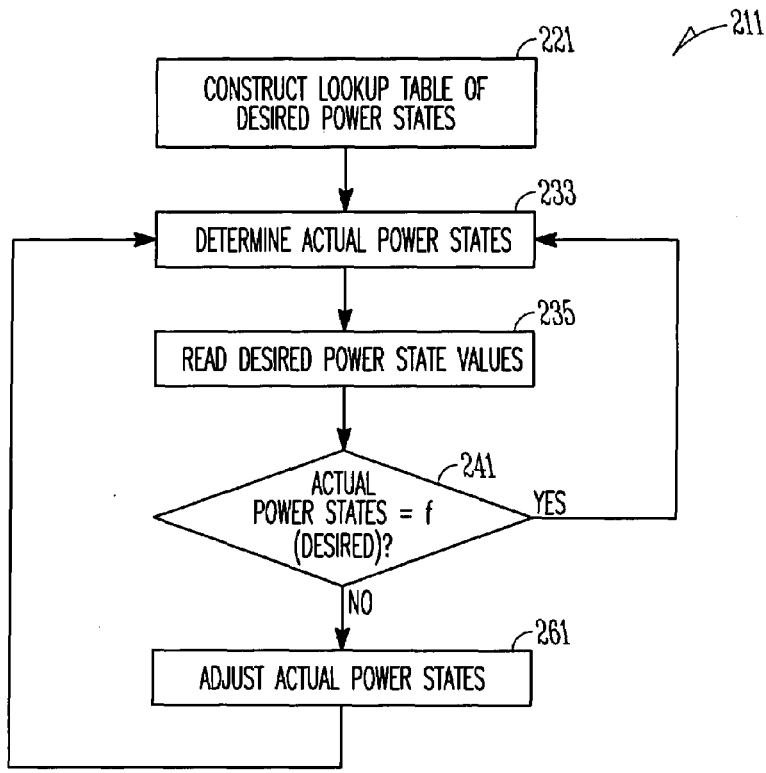

*FIG. 2*

| COMPONENT<br>OPERATION | I/O CPU | DISPLAY | CACHE | MEMORY |
|---|---|---|---|---|
| PLAYING A GAME —397 | $I_1$ | $D_1$ | $C_1$ | $M_1$ |
| OPERATING A WEB BROWSER | $I_2$ | $D_2$ | $C_2$ | $M_2$ |
| UTILIZING A WORD PROCESSOR | $I_3$ | $D_3$ | $C_3$ | $M_3$ |
| CALCULATING A SPREADSHEET | $I_4$ | $D_4$ | $C_4$ | $M_4$ |
| PLACING A TELEPHONE CALL | $I_5$ | $D_5$ | $C_5$ | $M_5$ |
| ACTIVATING AN ALARM —399 | $I_6$ | $D_6$ | $C_6$ | $M_6$ |
| RECORDING AUDIO INFORMATION | $I_7$ | 341—$D_7$ | $C_7$ | $M_7$ |
| RECORDING VIDEO INFORMATION | $I_8$ | $D_8$ | $C_8$ | $M_8$ |

*FIG. 3A*

| COMPONENT | I/O CPU | DISPLAY | CACHE | MEMORY |
|---|---|---|---|---|
| ACTUAL POWER STATES | $PS_I$ | $PS_D$ | $PS_C$ | $PS_M$ |

| COMPONENT | I/O CPU | DISPLAY | CACHE | MEMORY |
|---|---|---|---|---|
| ACTUAL POWER STATES | $f_I (I_n, I_m ... I_{etc.})$ | $f_D (D_n, D_m ... D_{etc.})$ | $f_C (C_n, C_m ... C_{etc.})$ | $f_M (M_n, M_m ... M_{etc.})$ |

APPARATUS, SYSTEM AND METHOD FOR ADJUSTING A SET OF ACTUAL POWER STATES ACCORDING TO A FUNCTION DEPENDING ON A SET OF DESIRED POWER STATES

TECHNICAL FIELD

Various embodiments described herein relate to information processing generally, such as apparatus, systems, and methods used to manage resources, such as power.

BACKGROUND INFORMATION

Existing power management systems may wastefully over-power applications subsystem components through reliance on inaccurate predictions of power usage with respect to those components.

BRIEF DESCRIPTION OF THE DRAWINGS

FIG. 2 is a flow diagram illustrating several methods according to various embodiments of the invention.

FIG. 3A is an exemplary table of desired power states according to various embodiments of the invention.

DETAILED DESCRIPTION

In some embodiments, a power management system may adjust the power states of various components, such as those located in an applications subsystem. Adjustments may be made by comparing actual power states for various components to desired power states, and then changing one or more of the actual power states to be substantially the same as the desired power states. Desired power states for a particular component may be related to its use, such as the number and/or kind of operations utilizing the component, for example.

For the purposes of this document, a number of definitions may be observed. An "actual power state" may include a level of power consumption and performance at which a component may be currently operating.

An "applications subsystem" may comprise an applications subsystem processor and/or components whose power consumption may be manageable, including (for example) buses, peripheral blocks, digital cameras, expansion memory, etc.

An "applications subsystem processor" may be a processor whose functions include directing activities of applications subsystem components and/or communications to/from those components.

A "component" may include any resource capable of operating at externally controllable levels of power consumption.

A "communications subsystem" may include receivers and/or transmitters, and/or the capability to engage in baseband signal processing, and may enable communications of any intelligence, including voice, data, geographical position, etc. to and/or from a mobile device.

A "desired power state" may include a selected level of power consumption for a component, for a given number of operations utilizing the component, perhaps based on a desired level of performance.

A "desired power state memory" may include a memory to store a set of desired power states.

"Number of operations" may comprise a numerical quantity of granted requests by one or more operations to utilize a component.

A "power state management agent" may include a module implementing a method of comparing a set of actual power states to a set of desired power states to determine whether the actual power states of one or more components may require adjustment.

A "power state register" may comprise a memory to store a set of actual power states.

Figure 1:
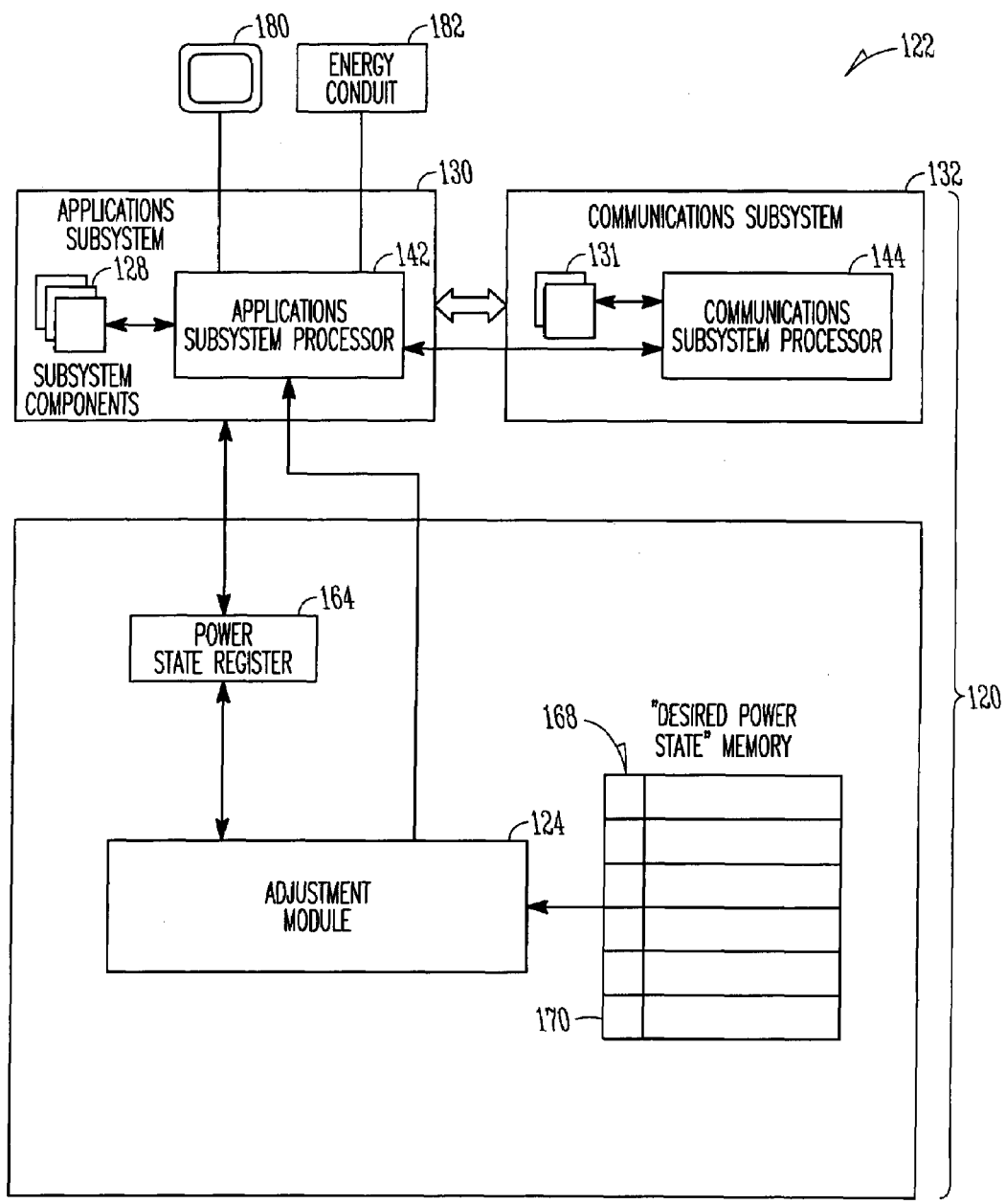
FIG. 1 is a block diagram of an apparatus and a system according to various embodiments of the invention.

FIG. 1 is a block diagram of an apparatus 120 and a system 122 according to various embodiments the invention, each of which may operate in the manner described above. For example, an apparatus 120 may include an adjustment module 124 to adjust a set of actual power states associated with components 128 included in an applications subsystem 130. Power states may be adjusted by turning components on/off, adjusting clock frequencies supplied to components, adjusting a component supply voltage, or adjust a component supply current.

The set of actual power states may be adjusted according to a function depending on a set of desired power states, independent of one or more power states associated with a communications subsystem 132 coupled to the applications subsystem 130. For example, the power states associated with the communications subsystem 132 may be directly associated with a set of components 131 included in the communications subsystem 132.

The set of desired power states may be associated with the components 128 and an operation selected from a number of operations. In some embodiments the number of operations may include playing a game, operating a web browser, operating a word processor, operating a spreadsheet, making a telephone call, activating an alarm, recording audio information, recording or receiving video information, including multimedia video information, and entering textual information, among others.

In some embodiments, an apparatus 120 may include a processor 142, such as an applications subsystem processor, coupled to the adjustment module 124 and/or another processor 144, such as a communications subsystem processor. In some embodiments, an apparatus 120 may include a power state register 164 to indicate values associated with a set of actual power states. In some embodiments, the power state register may indicate values associated with at least two of the set of actual power states.

In some embodiments, an apparatus 120 may include a desired power state memory 168 to store desired power states. In some embodiments the desired power state memory 168 may include a lookup table 170 having a plurality of desired power states, including a set of desired power states associated with the number of operations. The lookup table 170, as well as its contents (e.g., see various elements of the exemplary table 301 in FIG. 3A), may be dynamically constructed and/or dynamically altered. In some embodiments, algorithms may be implemented that "learn" over time such that various parameters stored in the table 170 may be adjusted to achieve a desired level or type of operation. Other embodiments may be realized.

For example, in some embodiments, a system 122 may include one or more of an apparatus 120, similar to or identical to that previously described, a processor 142, such as an applications subsystem processor, coupled to an adjustment module 124, a display 180, and an energy conduit 182. In some embodiments the energy conduit 182 may include one or more omnidirectional antennas and/or infra-red transceivers.

In some embodiments, a system 122 may include the adjustment module 124 to adjust a set of actual power states associated with components 128 included in an applications subsystem 130 according to a function that depends on a set of desired power states, independent of one or more power states associated with a communications subsystem 132 coupled to the applications subsystem 130. The set of desired power states may be associated with the components 128 and an operation selected from a number of operations.

In some embodiments, the system 122 may include a first processor 142, such as an applications subsystem processor and/or a second processor 144, such as a communications subsystem processor. In some embodiments of the apparatus 120 and system 122, the desired power state memory 168 may include a non-volatile memory to store the set of desired power states.

The apparatus 120, system 122, adjustment module 124, components 128, applications subsystem 130, communications subsystem 132, processors 142, 144, power state register 164, desired power state memory 168, and energy conduit 182 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 120 and system 122, and as appropriate for particular implementations of various embodiments of the invention.

It should also be understood that the apparatus and systems of various embodiments can be used in applications other than for optimizing power states of components, and thus various embodiments are not to be so limited. The illustrations of apparatus 120 and system 122 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

It should be noted that nothing disclosed herein restricts the aggregation of information in various state tables (e.g., placing tabular information regarding desired and actual power states in one or more locations). Thus, information respecting desired and actual power states may be co-located, and/or located apart from, the devices controlled. A wide variety of implementation may be achieved. One or more apparatus may operate to control a collection of computers, for example. Groups of apparatus/systems may operate and control various devices within a network. Further, a network level controller may utilize the methods and apparatus disclosed herein to control a collection of devices, including computers, spread over a wide area network.

FIG. 2 is a flow diagram illustrating several methods according to various embodiments of the invention. In some embodiments, a method 211 may (optionally) begin with constructing a lookup table of desired power states associated with a set of components and a number of operations at block 221. In some embodiments, the method 211 may include determining the values included in a set of actual power states at block 233. In some embodiments, the method 211 may include determining the values included in a set of actual power states at block 233 by accessing at least one register, such as a power state register. In some embodiments, the method 211 may include determining values included in the set of desired power states by accessing and/or reading values in a lookup table at block 235.

In some embodiments, the method 211 may include comparing a set of desired power states associated with components included in an applications subsystem and one or more operations from a number of operations with a set of actual power states associated with the components at block 241. In some embodiments, the method 211 may include activating a power state management agent to compare the set of desired power states with the set of actual power states at block 241.

Some embodiments of method 211 may include adjusting the set of actual power states according to a function depending on the set of desired power states, perhaps independent of one or more power states associated with a communications subsystem coupled to the applications subsystem at block 261. For example, some embodiments of the method 211 may include adjusting the set of actual power states to be substantially equal to the set of desired power states. Many variations of the method 211 are possible.

For example, some embodiments of method 211 may adjust the power applied to a first subset of components included in an applications subsystem and/or adjust a clock frequency applied to a second subset of the components included in an applications subsystem. In some embodiments of method 211, the set of desired power states may include one, two, or more of an ON state, an OFF state, a clock frequency, an applied voltage, and an applied current. Some embodiments of the method 211 may include determining a number of overlapping operations and/or selecting a set of desired power states according to the number of overlapping operations. Many scenarios to manage power may be realized.

For example, FIG. 3A is an exemplary table 301, which may contain a set of desired power states according to various embodiments of the invention as described above. For each operation 311 selected from a set of operations 331, a desired power state 341 may be assigned to each component 315 selected from a set of components 321.

Figures 3B, 3C, 4:
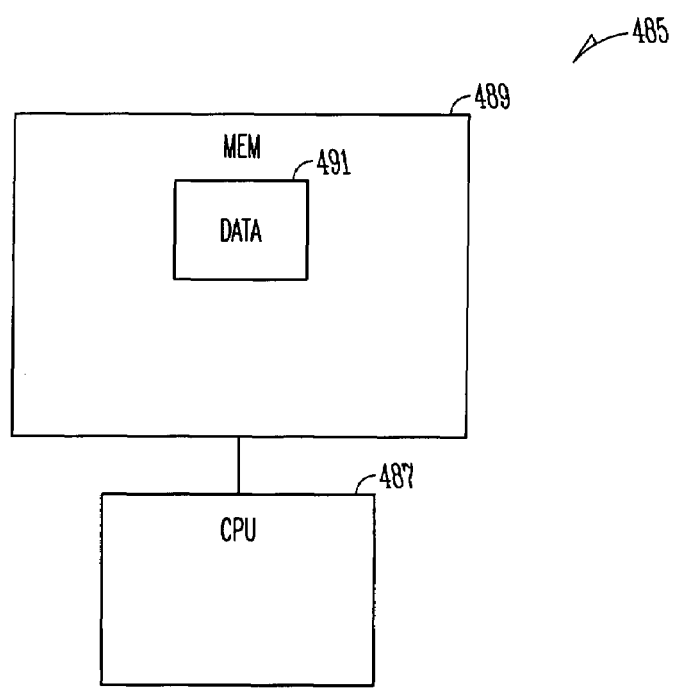
FIGS. 3B-3C are exemplary tables of actual power states according to various embodiments of the invention.
FIG. 4 is a block diagram of an article according to various embodiments of the invention.

FIG. 3B is an exemplary table 351, which may contain a set of actual power states according to various embodiments of the invention as described above. For each component 355 selected from a set of components 371, an actual power state 375 may exist. The actual power states may be measured, read from a memory, or otherwise determined in ways known to those of skill in the art.

FIG. 3C is an exemplary table 381, which may contain a set of actual power states according to various embodiments of the invention, perhaps adjusted according to the method 211 (see FIG. 2). For each component 385, selected from a set of components 391, an adjusted actual power state 395 may exist. The adjusted actual power states may be adjusted according to a function that depends on the set of desired power states. For example, an adjusted actual power state corresponding to a component may include the sum of the desired power states associated with a subset of operations utilizing the component.

Consider, for example, the condition wherein playing a game 397 (optionally) utilizes desired power state $D_1$ corresponding to display 393, and activating an alarm 399 (optionally) utilizes desired power state $D_6$ corresponding to display 393. The adjusted actual power state corresponding to display 393 may (optionally) include $AAPS_D$, wherein:

$$AAPS_D = D_1 + D_6.$$

It should be noted that the organization, structure, and scope of tables 301, 351, and/or 381 are merely exemplary. Other organizations, structures, and scopes may be employed in various embodiments. It should also be noted that the methods described herein may not have to be executed in the order described, or in any particular order. Moreover, various activities described with respect to the methods identified herein can be executed in serial, parallel, or iterative fashion. For the purposes of this document, the terms "information" and "data" may be used interchangeably. Information, including parameters, commands, operands, and other data, including data in various formats (e.g., time division, multiple access) and of various types (e.g., binary, alphanumeric, audio, video), can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment. Thus, other embodiments may be realized, as shown in FIG. 4.

FIG. 4 is a block diagram of an article 485 according to various embodiments, such as a computer, a memory system, a magnetic or optical disk, some other storage device, and/or any type of electronic device or system. The article 486 may comprise a processor 487 coupled to a machine-accessible medium such as a memory 489 (e.g., a memory including an electrical, optical, or electromagnetic conductor) having associated information 491 (e.g., computer program instructions, and/or other data) which, when accessed, results in a machine (e.g., the processor 487) performing such actions as comparing a set of desired power states associated with components included in an applications subsystem and one or more operations from a number of operations with a set of actual power states associated with the components.

Some activities may include adjusting the set of actual power states according to a function depending on the set of desired power states independent of at least one power state associated with a communications subsystem coupled to the applications subsystem. Some actions may include accessing a power state register to determine values associated with the set of actual power states.

Other actions may include activating a power state management agent to compare the set of desired power states with the set of actual power states. Some actions may include determining the number of operations to be conducted at an overlapping time, and/or selecting a set of desired power states associated with the number of operations.

Implementing the apparatus, systems, and methods described herein may render power management in mobile devices more efficient, thereby increasing the operating time obtained from self-contained power sources, such as batteries.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
    comparing a set of desired power states associated with components included in an applications subsystem and one or more operations from a number of operations with a set of actual power states associated with the components; and adjusting the set of actual power states according to a function depending on the set of desired power states and independent of at least one power state associated with a communications subsystem coupled to the applications subsystem.

2. The method of claim 1, including:
adjusting the set of actual power states to be substantially equal to the set of desired power states.

3. The method of claim 1, further including:
determining values included in the set of desired power states by accessing a lookup table.

4. The method of claim 1, further including:
constructing a lookup table associated with the components and the number of operations.

5. The method of claim 1, further including:
determining the values included in the set of actual power states by accessing at least one register.

6. The method of claim 1, further including:
adjusting a power applied to a first subset of the components; and
adjusting a clock frequency applied to a second subset of the components.

7. The method of claim 6, wherein the set of desired power states includes at least two of an ON state, an OFF state, a clock frequency, an applied voltage, and an applied current.

8. An article including a machine-accessible medium having associated information, wherein the information, when accessed, results in a machine performing:
comparing a set of desired power states associated with components included in an applications subsystem and one or more operations selected from a number of operations with a set of actual power states associated with the components; and
adjusting the set of actual power states according to a function depending on the set of desired power states and independent of at least one power state associated with a communications subsystem coupled to the applications subsystem.

9. The article of claim 8, wherein the components include at least one of a peripheral block, a bus, a memory, an input interface, and an output interface.

10. The article of claim 8, wherein the information, when accessed, results in a machine performing:
accessing a power state register to determine values associated with the set of actual power states.

11. The article of claim 8, wherein the information, when accessed, results in a machine performing:
activating a power state management agent to compare the set of desired power states with the set of actual power states.

12. The article of claim 8, wherein the information, when accessed, results in a machine performing:
determining a number of overlapping operations; and
selecting the set of desired power states according to the number of overlapping operations.

13. An apparatus, including:
an adjustment module to adjust a set of actual power states associated with components included in an applications subsystem according to a function depending on a set of desired power states and independent of at least one power state associated with a communications subsystem coupled to the applications subsystem, wherein the set of desired power states is associated with the components and an operation selected from a number of operations.

14. The apparatus of claim 13, further including:
an applications subsystem processor coupled to the adjustment module; and
a communications subsystem processor coupled to the applications subsystem processor.

15. The apparatus of claim 13, further including:
a power state register to indicate values associated with at least two of the set of actual power states.

16. The apparatus of claim 13, further including:
a memory to store a lookup table to include a plurality of desired power states, including the set of desired power states associated with the number of operations.

17. A system, including:
an adjustment module to adjust a set of actual power states associated with components included in an applications subsystem according to a function depending on a set of desired power states and independent of at least one power state associated with a communications subsystem coupled to the applications subsystem, wherein the set of desired power states is associated with the components and an operation selected from a number of operations;
a processor coupled to the adjustment module; and
an energy conduit coupled to the processor.

18. The system of claim 17, wherein the energy conduit is selected from one of an omnidirectional antenna and an infra-red transceiver.

19. The system of claim 17, wherein the number of operations include at least three of playing a game, operating a web browser, operating a word processor, operating a spreadsheet, making a telephone call, activating an alarm, recording audio information, recording video information, receiving video information, and entering textual information.

20. The system of claim 17, wherein the processor comprises an applications subsystem processor, further including:
a communications subsystem processor coupled to the processor.

21. The system of claim 17, further including:
a non-volatile memory to store the set of desired power states.

* * * * *